UNITED STATES PATENT OFFICE.

GRANDERSON MERSHON, M. D., OF BROOKVILLE, IOWA.

IMPROVED MEDICAL COMPOUND.

Specification forming part of Letters Patent No. 53,852, dated April 10, 1866.

*To all whom it may concern:*

Be it known that I, GRANDERSON MERSHON, of Brookville, in the county of Jefferson, in the State of Iowa, have invented a new and useful Compound for the Cure of Diseases of the Eyes, of which the following is a specification.

The nature of my invention consists in the compounding of six different substances.

To enable others skilled in the science of compounding to make and use my compound, I proceed to give the names and amount of each article used and the mode of compounding and using the same.

To one pint of soft water I add sixty grains sulphate of zinc, forty grains sugar of lead, twenty-five grains nitrate silver, fifty grains golden seal, fifteen grains sulphate morphine, ten grains salicine. I then allow it to stand a day or two, agitating once a day by shaking the bottle. The compound is then ready for use.

I apply it to the eye by dropping from three to five drops upon the naked eye-ball. The lid being closed, I apply a linen cloth wrung from warm water, which is to remain ten or fifteen minutes.

What I claim as my invention or discovery, and desire to secure by Letters Patent, is—

The combining the above-named substances in such proportions that the medicinal virtues of each are greatly increased, forming a specific for inflammatory diseases of the eyes.

GRANDERSON MERSHON, M. D.

Witnesses:
    THOS. D. EVANS,
    WM. LONG.